United States Patent [19]

Yoshimi

[11] Patent Number: 5,784,123
[45] Date of Patent: Jul. 21, 1998

[54] TELEVISION SIGNAL DISPLAY APPARATUS WITH PICTURE QUALITY COMPENSATION

[75] Inventor: Osamu Yoshimi, Osaka, Japan

[73] Assignee: Matsushita Electric Industrial Co., Ltd., Osaka, Japan

[21] Appl. No.: 646,717

[22] Filed: May 8, 1996

[30] Foreign Application Priority Data

May 8, 1995 [JP] Japan .................. 7-109263

[51] Int. Cl.$^6$ .................................................. H04N 5/46
[52] U.S. Cl. .................. 348/556; 348/558; 348/445
[58] Field of Search .......................... 348/556, 557, 348/558, 445; H04N 5/46

[56] References Cited

U.S. PATENT DOCUMENTS

| | | | |
|---|---|---|---|
| 5,146,331 | 9/1992 | Tsuchida | 348/556 |
| 5,384,600 | 1/1995 | Kaizaki | 348/556 |

FOREIGN PATENT DOCUMENTS

| | | |
|---|---|---|
| 0 447 167 | 9/1991 | European Pat. Off. . |
| 0 606 855 | 7/1994 | European Pat. Off. . |
| 5-183834 | 7/1993 | Japan . |
| 06303556 | 10/1994 | Japan . |

OTHER PUBLICATIONS

N. Nakagaki et al., "Wide Aspect TV Receiver with Aspect Detection and Non-Linear Control for Picture Quality", *IEEE Transactions on Consumer Electronics*, vol. 40, No. 3, pp. 743–751 (Aug. 1994).

European Search Report dated Mar. 5, 1997.

*Primary Examiner*—Sherrie Hsia
*Attorney, Agent, or Firm*—Ratner & Prestia

[57] ABSTRACT

A television signal display apparatus includes a main picture quality adjustment value memory for storing a picture quality adjustment value set according to a viewer's preference; a sub picture quality adjustment value memory for storing a picture quality adjustment value preliminarily set for every aspect ratio; a microcomputer for calculating an optimum picture quality adjustment value for a new aspect ratio from the picture quality adjustment values read from the main and sub picture quality adjustment value memories, setting the optimum picture quality adjustment value in a picture quality adjusting circuit and making an aspect ratio selecting circuit work. When the aspect ratio is changed, the viewer can watch a picture having the same picture quality as before the change without the incongruity due to picture quality differences produced by the aspect ratio selection when the picture is of such low luminance that ABL does not function properly.

5 Claims, 4 Drawing Sheets

TELEVISION SIGNAL DISPLAY APPARATUS WITH PICTURE QUALITY COMPENSATION

BACKGROUND OF THE INVENTION

The present invention relates to a color television signal display apparatus having a function to compensate picture quality variation due to aspect ratio selection.

When an aspect ratio of a picture is changed, as long as a picture quality adjustment value of a television receiver is not changed, an anode current per unit area of picture on a cathode ray tube (CRT, hereafter) is small for a large screen size. Accordingly, the picture has sometimes been felt to be darker in brightness, lower in color saturation or lower in contrast than viewer's desire.

For example, Japanese Patent Laid-Open 5-183834 is proposed as a countermeasure. That is, ABL limiting resistors are selected or a plurality of picture quality adjustment values are set according to viewer's desire and the picture quality adjustment value can be selected out of the picture quality adjustment values.

The function of aspect ratio selection is explained below, referring to drawings.

FIG. 4 is a block diagram of an ABL selecting circuit in accordance with the prior art. The symbol 111 is a CRT. The symbol 112 is a flyback transformer (FBT, hereafter). The symbols 113 and 114 are ABL limiting resistors to limit an anode current of CRT 111. The symbol 115 is a diode for ABL clamping. The symbol 116 is an ABL limiting resistor selecting switch for changing a limiting value of an anode current due to ABL action by short circuiting ABL limiting resistor 114.

The function of an ABL selecting circuit in accordance with the prior art configured like the above is explained below, referring to FIG. 4.

In FIG. 4, when a picture is displayed with a 4:3 aspect ratio, ABL limiting resistor selecting switch 116 is in an off-position and the resistance of the ABL limiting resistor is a summation of the resistances of ABL limiting resistors 113 and 114. As a result, the anode current limited by ABL action is set small.

When a picture is displayed with a 16:9 aspect ratio, ABL limiting resistor selecting switch 116 is in an on-position and the resistance of the ABL limiting resistor is a resistance of only ABL limiting resistor 113. As a result, the anode current limited by ABL action is set to a larger value than the value at 4:3 aspect ratio.

Thus, the maximum anode current of a CRT when a bright picture is displayed with a 16:9 aspect ratio can be made larger than that when displayed with a 4:3 aspect ratio and the anode current per unit area of picture can be made nearly constant even if the aspect ratio varies.

However, these countermeasure are for a case when the ABL circuit works at a comparatively bright picture and when the picture is comparatively dark and the ABL circuit does not work, the effect is unexpectable. Further, viewers must manually select for a good performance such as color saturation, picture sharpness, etc.

SUMMARY OF THE INVENTION

The present invention solves the above problems and aims to present a television signal display apparatus which when the picture is changed to a picture having a different aspect ratio, makes the picture quality no incongruity even for so comparatively dark picture as ABL does not work and can display the same picture as that before selecting a different aspect ratio even if viewers do not manually turn an ABL limiting resistor selecting switch.

To achieve this object, a television signal display apparatus in accordance with the present invention includes aspect ratio selecting command means for outputting an aspect ratio selecting command signal;

picture quality adjustment value storing means for storing a picture quality adjustment value preliminary set for every aspect ratio;

aspect ratio selecting process means for reading a picture quality adjustment value suitable for an aspect ratio newly selected from the picture quality adjustment value storing means at every aspect ratio selection and setting the values in a picture quality adjusting means;

picture quality adjusting means for selecting a picture quality adjustment value by a picture quality selecting signal outputted from the aspect ratio selecting process means; and aspect ratio selecting means for selecting an aspect ratio of the picture by an aspect ratio selecting signal outputted from the aspect ratio selecting process means;

and an optimum picture quality is obtained by automatic adjustment at every aspect ratio selection.

By providing with the above configuration, the television signal display apparatus can always automatically adjust the picture quality so as to get an optimum picture quality for a new aspect ratio at every aspect ratio selection.

Furthermore, an optimum picture quality for viewer's desire can be automatically obtained by adding a memory to store various kinds of picture quality adjustment values set by the viewer in the above-described configuration and determining the new picture quality adjustment values considering these picture quality adjustment values at every aspect ratio selection.

DETAILED DESCRIPTION OF THE INVENTION (First exemplary embodiment)

Figure 1:
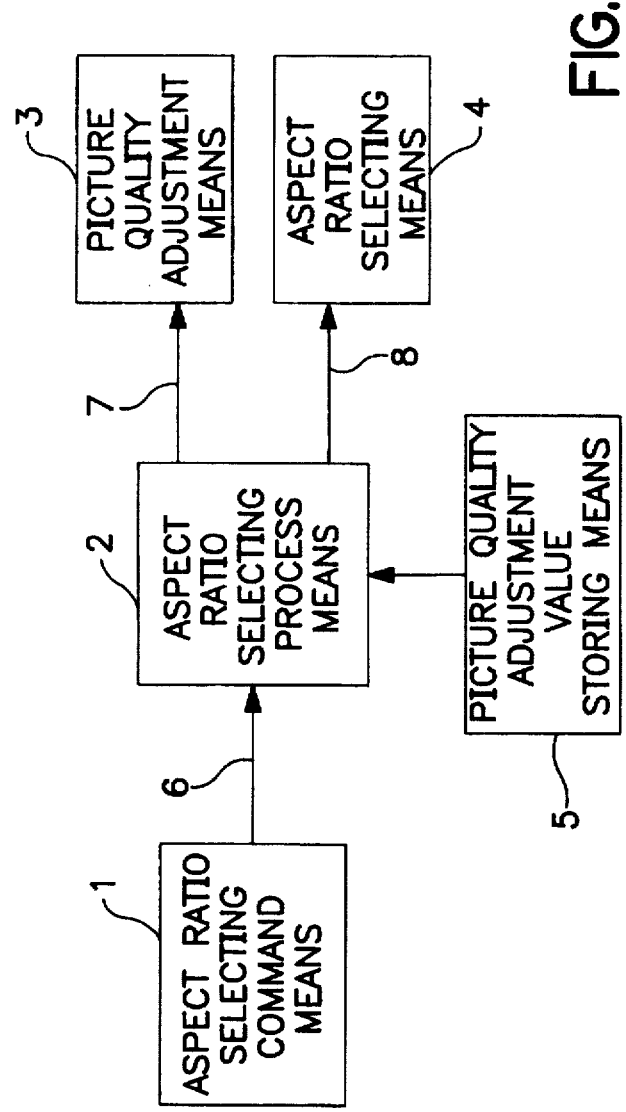
FIG. 1 is a block diagram of a main part which automatically adjusts a picture quality variation due to aspect ratio selection in a television signal display apparatus in accordance with a first exemplary embodiment of the present invention.

FIG. 1 is a block diagram of a main part which automatically adjusts a picture quality variation due to aspect ratio selection in a television signal display apparatus in accordance with a first exemplary embodiment of the present invention.

In FIG. 1, an aspect ratio selecting command signal 6 which is an output signal from an aspect ratio selecting command means 1 is supplied to an aspect ratio selecting process means 2. Aspect ratio selecting process means 2 supplies an aspect ratio selecting signal 8 to an aspect ratio selecting means 4 and at the same time, supplies an information read from a picture quality adjustment value storing means 5 storing picture quality adjustment values to a picture quality adjusting means 3 as a picture quality selecting signal 7.

The function of a television signal display apparatus configured as above is explained below, referring to FIG. 1.

In FIG. 1, when an aspect ratio selecting command signal 6 outputted from an aspect ratio selecting command means 1 is inputted to an aspect ratio selecting process means 2, aspect ratio selecting process means 2 outputs an aspect ratio selecting signal 8 to an aspect ratio selecting means 4 and selects an aspect ratio of a picture to be displayed on a CRT and at the same time, reads out a picture quality adjustment value corresponding to an aspect ratio newly selected from a picture quality adjustment storing means 5 storing picture quality adjustment values preliminarily set at for example, a production process of television signal display apparatuses and outputs a picture quality selecting signal 7 through a D/A converter or a bus line (both are not shown) and sets the picture quality adjustment value read out from picture quality adjustment value storing means 5 in picture quality adjusting means 3.

Thus, viewers can watch a picture without noticing any picture quality variation due to aspect ratio difference at every aspect ratio selection.

The adjustment of the picture quality adjustment values stored in picture quality adjustment value storing means 5 is different from the adjustment of only the brightness by selecting an ABL limiting resistor in the prior art and can arbitrarily select brightness, contrast, color saturation, hue, picture sharpness, etc.

Thus, the present invention presents a television signal display apparatus which can always automatically display an optimum picture quality, independent of its aspect ratio.

(Second exemplary embodiment)

Figure 2:
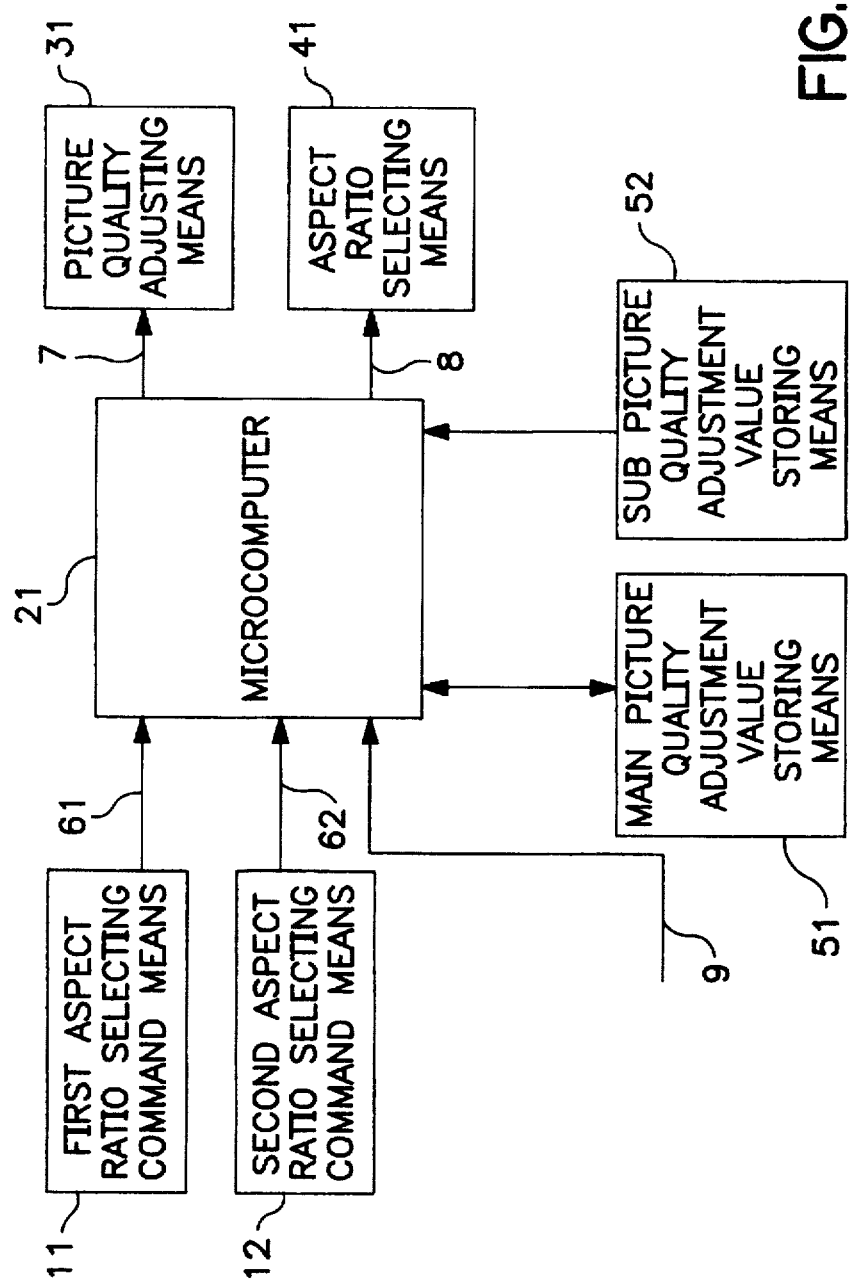
FIG. 2 is a block diagram of a main part which automatically adjusts a picture quality variation due to aspect ratio selection in a television signal display apparatus in accordance with a second exemplary embodiment of the present invention.

FIG. 2 is a block diagram of a main part which automatically adjusts a picture quality variation due to aspect ratio selection in a television signal display apparatus in accordance with a second exemplary embodiment of the present invention.

An aspect ratio selecting command signal 61 is outputted from first aspect ratio selecting command means 11 commanding to select an aspect ratio.

Another aspect ratio selecting command signal 62 is outputted from second aspect ratio selecting command means 12 commanding to select an aspect ratio by an aspect ratio discriminating signal obtained from an input signal, for example, an ED-2 signal (ED is a short form of Extended Definition and ED-2 is a kind of new television system in Japan) or a television signal outputted from a VCR (Video Cassette Recorder).

The aspect ratio selecting command signals 61 and 62 are supplied to a microcomputer 21 working as aspect ratio selecting process means.

The microcomputer 21 supplies an aspect ratio selecting signal 8 and a picture quality selecting signal 7 to aspect ratio selecting means 41 and picture quality adjusting means 31, respectively.

A picture quality adjusting signal 9 used for setting a picture quality by the viewer is inputted to microcomputer 21.

A main picture quality adjustment value storing means 51 storing a main picture quality adjustment value set by the viewer and sub picture quality adjustment value storing means 52 storing a sub picture quality adjustment value preliminarily set, for example, at a production line of television signal display apparatuses are connected to microcomputer 21.

Figure 3:
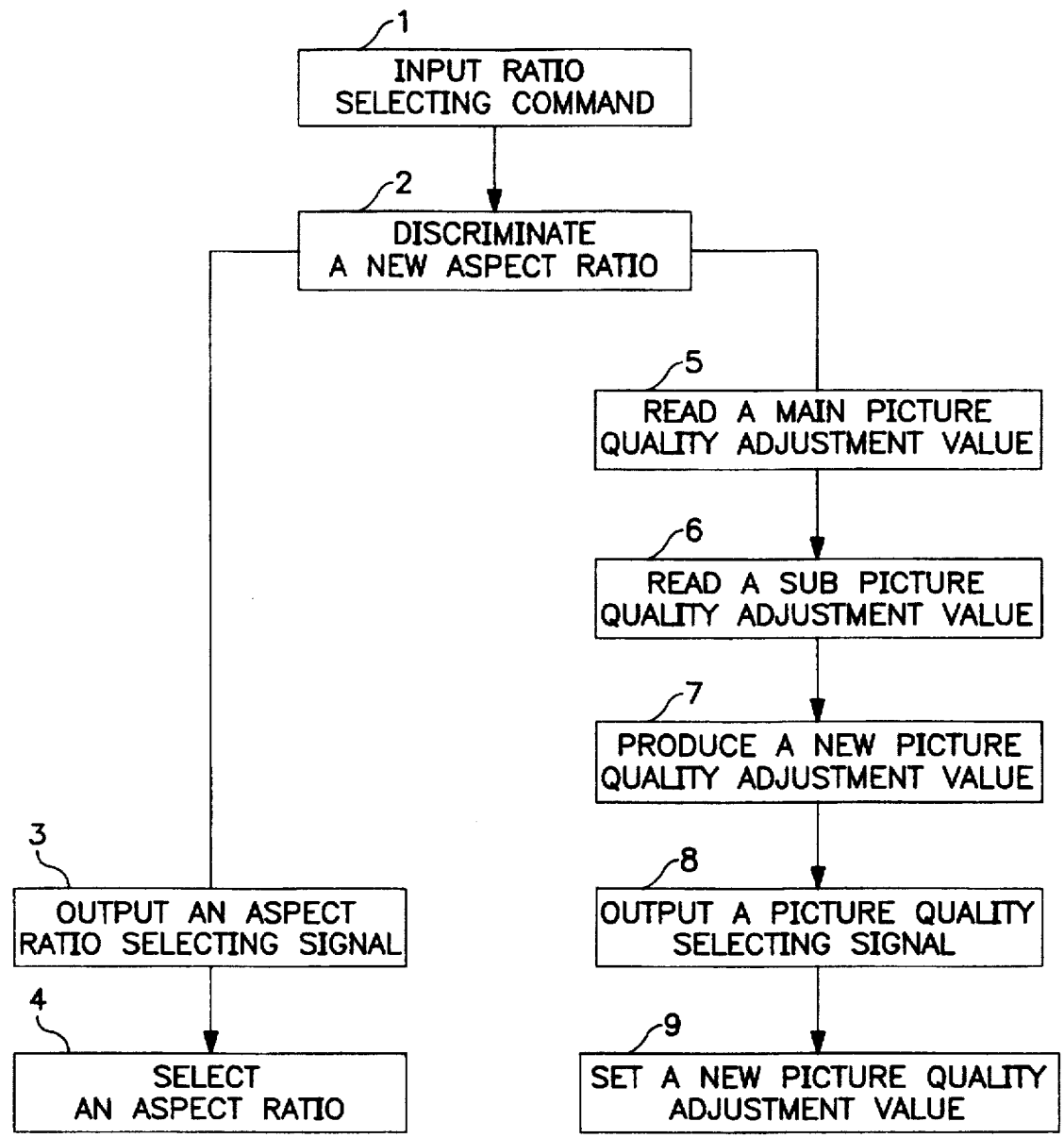
FIG. 3 is a flow chart showing a function of a circuit which automatically adjusts a picture quality variation due to aspect ratio selection in a television signal display apparatus in accordance with a second exemplary embodiment of the present invention.
Figure 4:
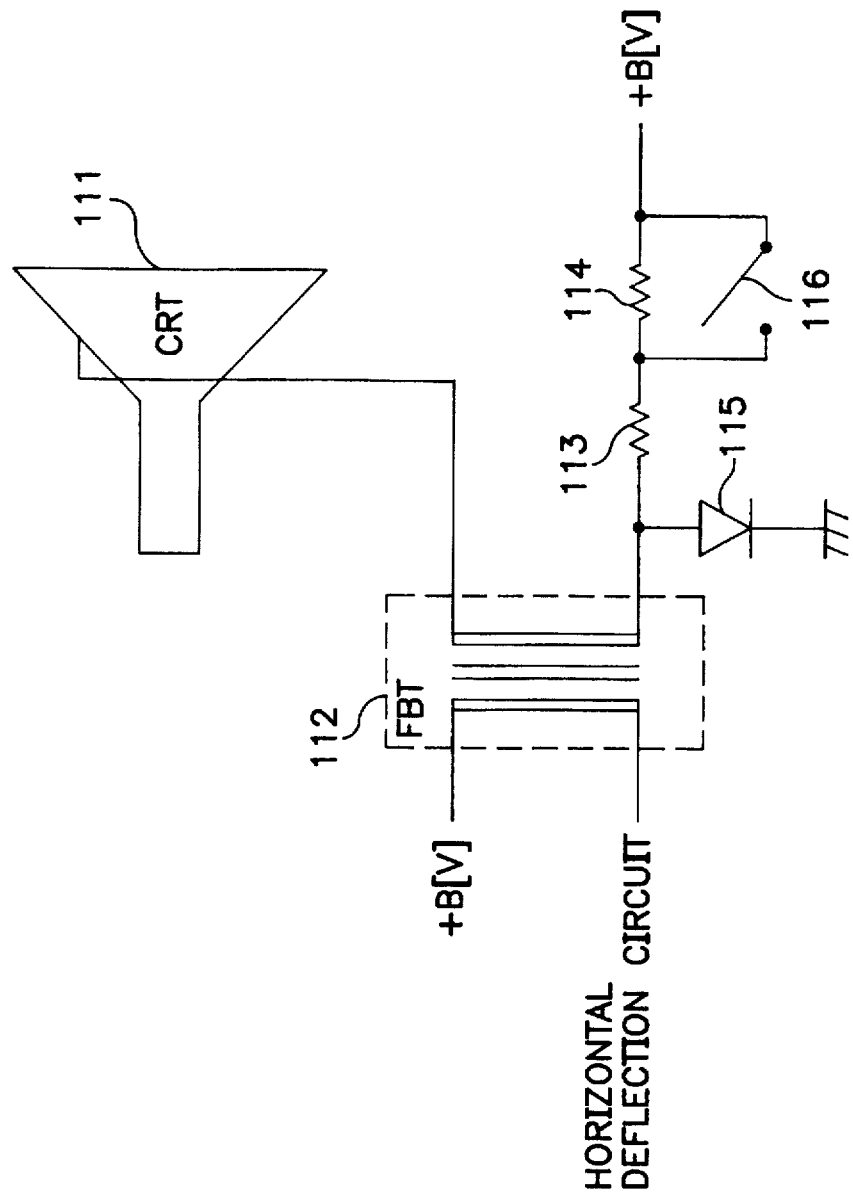
FIG. 4 is a circuit diagram of an ABL selecting circuit which compensates a picture quality variation due to aspect ratio selection in accordance with the prior art.

The function of a television signal display apparatus configured like the above is explained below, referring to FIGS. 2 and 3.

Step 1: Aspect ratio selecting command signal 61 or 62 is inputted to microcomputer 21.

Step 2: Microcomputer 21 discriminates a new aspect ratio inputted.

Step 3: Microcomputer 21 supplies an aspect ratio selecting signal 8 to aspect ratio selecting means 41.

Step 4: Microcomputer 21 selects an aspect ratio of the picture.

Step 5: At the same time, microcomputer 21 reads out from main picture quality adjustment value storing means 51 a main picture quality adjustment value of the picture of which picture quality was set by the viewer and has been watched by the viewer, before selecting an aspect ratio.

Step 6: Microcomputer 21 reads out from sub picture quality adjustment value storing means 52 a sub picture quality adjustment value of the picture according to the aspect ratio newly set.

Step 7: Microcomputer 21 works as operation means for calculating a new picture quality adjustment value from the picture quality adjustment values read out just before and produces a new picture quality adjustment value according to viewer's preference for a picture having a new aspect ratio.

Step 8: Microcomputer 21 outputs a picture quality selecting signal 7 through a D/A converter or a bus line (both are not drawn) Step 9: Microcomputer 21 sets the new picture quality adjustment value produced at step 7 in picture quality adjusting means 31.

Thus, viewers can watch a picture in the picture quality according to their preference for any aspect ratio without noticing any picture quality variation due to aspect ratio difference at every aspect ratio selection without any manual adjustment by them.

Thus, the present invention presents a television signal display apparatus which can automatically display an optimum picture quality according to the viewer's preference and independent of its aspect ratio.

It is obvious that a television receiver is included in a television signal display apparatus described above.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A television signal display apparatus comprising:

first aspect ratio selecting command means for outputting an aspect ratio selecting command signal to select an aspect ratio of a displayed picture by an aspect ratio selecting command from a viewer;

second aspect ratio selecting command means for outputting a command signal to select the aspect ratio of the displayed picture by an aspect ratio discriminating signal included in an input signal;

picture quality adjustment value storing means for storing a picture quality adjustment value preliminarily set to get a picture quality corresponding to various kinds of aspect ratios of a picture;

aspect ratio selecting process means for outputting an aspect ratio selecting signal which varies the aspect ratio of the displayed picture to an aspect ratio selecting means by said aspect ratio selecting command signal and said command signal output from said first and second aspect ratio selecting command means, reading out a picture quality adjustment value corresponding to an aspect ratio to be selected from said picture quality adjustment value storing means and outputting a picture quality selecting signal to select a picture quality adjustment value of the displayed picture to a picture quality adjusting means;

said picture quality adjusting means for selecting the picture quality adjustment value by the picture quality selecting signal output from said aspect ratio selecting process means; and said aspect ratio selecting means for selecting an aspect ratio of the picture by the aspect ratio selecting signal output from said aspect ratio selecting process means.

2. A television signal display apparatus comprising:

aspect ratio selecting command means for outputting an aspect ratio selecting command signal to select an aspect ratio of a displayed picture;

picture quality adjustment value storing means for storing a picture quality adjustment value preliminarily set to get a picture quality corresponding to various kinds of aspect ratios of a picture, and having
  i) main picture quality adjustment value storing means for storing a main picture quality adjustment value set by a picture quality adjusting signal from a viewer; and
  ii) sub picture quality adjustment value storing means for storing a sub picture quality adjustment value preliminarily set at a production line and the like of the television signal display apparatuses;

aspect ratio selecting process means for outputting an aspect ratio selecting signal which varies the aspect ratio of the displayed picture to an aspect ratio selecting means by said aspect ratio selecting command signal output from said aspect ratio selecting command means, reading out a picture quality adjustment value corresponding to an aspect ratio to be selected from said picture quality adjustment value storing means and outputting a picture quality selecting signal to select a picture quality adjustment value of the displayed picture to a picture quality adjusting means;

said picture quality adjusting means for selecting the picture quality adjustment value by the picture quality selecting signal output from said aspect ratio selecting process means;

said aspect ratio selecting means for selecting an aspect ratio of the picture by the aspect ratio selecting signal output from said aspect ratio selecting process means; and further aspect ratio selecting process means having
  i) means for calculating a) said main picture quality adjustment value read out from said main picture quality adjustment value storing means and b) said sub picture quality adjustment value read out from said sub picture quality adjustment value storing means and calculating the picture quality adjustment value suitable for the viewer's desire even in a picture having a new aspect ratio;
  ii) means for outputting the picture quality selecting signal to said picture quality adjusting means; and
  iii) means for outputting the aspect ratio selecting signal to vary the aspect ratio of the displayed picture to said aspect ratio selecting means by said command signal from said aspect ratio selecting command means.

3. A television signal display apparatus as recited in claim 1, wherein an adjusting factor of the picture quality adjustment value stored in said picture quality adjustment value storing means comprises at least one of brightness, contrast, color saturation, hue and picture sharpness of the displayed picture.

4. A television signal display apparatus as recited in claim 2, wherein an adjusting factor of the picture quality adjustment value stored in said picture quality adjustment value storing means comprises at least one of brightness, contrast, color saturation, hue and picture sharpness of the displayed picture.

5. A television signal display apparatus as recited in claim 2, wherein said calculating means calculates a further picture quality adjustment value based on said main picture quality adjustment value and said sub picture quality adjustment value, and said picture quality selection signal output to said picture quality adjusting means is based on said further picture quality adjustment value.

* * * * *